(12) United States Patent
Chou et al.

(10) Patent No.: US 10,956,291 B2
(45) Date of Patent: Mar. 23, 2021

(54) METHOD, COMPUTER APPARATUS, AND USER INTERFACE FOR PERFORMING AUTOMATIC TEST UPON STORAGE DEVICES

(71) Applicant: Silicon Motion, Inc., Hsinchu County (TW)

(72) Inventors: Li-Ling Chou, New Taipei (TW); Shang-Ta Yang, Taoyuan (TW)

(73) Assignee: Silicon Motion, Inc., Hsinchu County (TW)

( * ) Notice: Subject to any disclaimer, the term of this patent is extended or adjusted under 35 U.S.C. 154(b) by 19 days.

(21) Appl. No.: 16/672,506

(22) Filed: Nov. 3, 2019

(65) Prior Publication Data

US 2020/0151072 A1    May 14, 2020

(30) Foreign Application Priority Data

Nov. 14, 2018 (CN) .......................... 201811352745.9

(51) Int. Cl.
*G06F 11/22* (2006.01)
*G06F 11/263* (2006.01)

(52) U.S. Cl.
CPC ...... *G06F 11/2221* (2013.01); *G06F 11/2289* (2013.01); *G06F 11/263* (2013.01)

(58) Field of Classification Search
CPC ............. G06F 11/2221; G06F 11/2273; G06F 11/2289; G06F 11/263
USPC ................................. 714/39, 42, 45, 46, 57
See application file for complete search history.

(56) References Cited

U.S. PATENT DOCUMENTS

| | | | | |
|---|---|---|---|---|
| 4,907,230 A | * | 3/1990 | Heller | G01R 31/2834 706/916 |
| 6,449,741 B1 | * | 9/2002 | Organ | G01R 1/025 714/46 |
| 6,760,865 B2 | | 7/2004 | Ledford | |
| 2014/0123117 A1 | | 5/2014 | Lee | |
| 2015/0112625 A1 | | 4/2015 | Lin | |
| 2018/0196103 A1 | * | 7/2018 | Champoux | G01R 31/31724 |

FOREIGN PATENT DOCUMENTS

| | | |
|---|---|---|
| TW | 201024995 A1 | 7/2010 |
| TW | 201035982 A1 | 10/2010 |
| TW | I387973 | 3/2013 |

\* cited by examiner

*Primary Examiner* — Joseph R Kudirka
(74) *Attorney, Agent, or Firm* — Winston Hsu

(57) ABSTRACT

A method of automatic test upon storage devices, connected to user interface of computer apparatus via external connection port(s), includes: providing user interface which can be controlled by user to input at least one set of setting parameters for execution of testing task of at least one test software tool; automatically configuring information of at least one field for the execution of the testing task according to the at least one set of setting parameters; automatically executing the at least one test software tool to perform the testing task upon the multiple storage devices according to the information of the at least one field; and automatically storing result of the testing task and displaying the result on the user interface for user.

20 Claims, 3 Drawing Sheets

METHOD, COMPUTER APPARATUS, AND USER INTERFACE FOR PERFORMING AUTOMATIC TEST UPON STORAGE DEVICES

BACKGROUND OF THE INVENTION

1. Field of the Invention

The invention relates to an automatic test scheme, and more particularly to method, computer apparatus, and user interface for performing automatic test upon multiple storage devices which are to be tested.

2. Description of the Prior Art

Generally speaking, for mass production of multiple storage devices such as SSD devices at the factory, a conventional mass production test flow at the factory is to adopt different standardized test software tools on the market, which have been validated, to perform the mass production test. The different standardized test software tools operate individually and independently. An operator/user at the factory needs to manually and sequentially open/activate different test software tools one by one to perform different mass production tests. Only single one storage device can be tested each time when a selected test software tool is opened or activated. In addition, each time when opening and executing one test software tool, the operator needs to manually click, select, and configure corresponding setting parameter(s) and field(s) for the test by him or her. Also, the operator needs to manually save corresponding test results and manually check whether a storage device passes the test of a particular software item each time after the execution of one test software tool is completed. Thus, the conventional mass production test flow cannot meet the requirements of today's high-efficiency mass production.

SUMMARY OF THE INVENTION

Therefore one of the objectives of the invention is to provide a program, method, and corresponding device capable of automatically opening, executing, configuring different test software tools to perform automatic test upon multiple different storage devices, to solve the above-mentioned problems.

According to embodiments of the invention, a method for performing automatic test upon multiple solid-state drive (SSD) storage devices to be tested is disclosed. The multiple SSD storage devices are to be connected to a computer apparatus via a first external connection port interface and at least one second external connection port interface. The first external connection port interface are different from the at least one second external connection port interface. The computer apparatus includes a user interface. The automatic test is controlled by the computer apparatus to sequentially or simultaneously send multiple test signals to multiple flash memory controllers of the multiple SSD storage devices which are connected to the first external connection port interface and the at least one second external connection port interface via the first external connection port interface and the at least one second external connection port interface for performing corresponding testing. The multiple flash memory controllers are arranged for performing the corresponding testing upon multiple flash memory chips of the multiple SSD storage devices according to the multiple test signals received from the computer apparatus so as to respectively obtain and record multiple test results of the multiple SSD storage devices and then arranged for respectively reporting the multiple test results from the multiple flash memory controllers to the computer apparatus via the first external connection port interface and the at least one second external connection port interface to make the computer apparatus store the multiple test results into a storage circuit of the computer apparatus. The method comprises: providing the user interface which is to be controlled by a user to input at least one set of setting parameters used by execution of a testing task of at least one test software tool upon the multiple SSD storage devices; automatically configuring information of at least one field referenced by the execution of the testing task of the at least one test software tool according to the at least one set of setting parameters; automatically executing the at least one test software tool to perform the testing task respectively upon the multiple SSD storage devices according to the information of the at least one field; and automatically storing a test result of the testing task completed by the at least one test software tool and displaying the test result on the user interface to notify the user.

According to the embodiments, a computer apparatus used for performing automatic test upon multiple SSD storage devices to be tested is disclosed. The multiple SSD storage devices are to be connected to a computer apparatus via a first external connection port interface and at least one second external connection port interface. The first external connection port interface are different from the at least one second external connection port interface. The computer apparatus includes a user interface. The automatic test is controlled by the computer apparatus to sequentially or simultaneously send multiple test signals to multiple flash memory controllers of the multiple SSD storage devices which are connected to the first external connection port interface and the at least one second external connection port interface via the first external connection port interface and the at least one second external connection port interface for performing corresponding testing. The multiple flash memory controllers are arranged for performing the corresponding testing upon multiple flash memory chips of the multiple SSD storage devices according to the multiple test signals received from the computer apparatus so as to respectively obtain and record multiple test results of the multiple SSD storage devices and then arranged for respectively reporting the multiple test results from the multiple flash memory controllers to the computer apparatus via the first external connection port interface and the at least one second external connection port interface to make the computer apparatus store the multiple test results into a storage circuit of the computer apparatus. The computer apparatus further comprises a processor. The user interface is to be controlled by a user to input at least one set of setting parameters used by execution of a testing task of at least one test software tool upon the multiple SSD storage devices. The storage circuit is used for storing a specific program code for performing the automatic test. The processor is coupled to the storage circuit and the user interface, and is used for reading the specific program code form the storage circuit to execute the specific program code for: automatically configuring information of at least one field referenced by the execution of the testing task of the at least one test software tool according to the at least one set of setting parameters; automatically executing the at least one test software tool to perform the testing task respectively upon the multiple SSD storage devices according to the information of the at least one field; and automatically storing a test result of the testing task completed by the at least one test software tool and displaying the test result on the user interface to notify the user.

According to the embodiments, a user interface of a computer apparatus capable of performing automatic test upon multiple SSD storage devices to be tested is disclosed. The multiple SSD storage devices are to be connected to a computer apparatus via a first external connection port interface and at least one second external connection port interface. The first external connection port interface are different from the at least one second external connection port interface. The automatic test is controlled by the computer apparatus to sequentially or simultaneously send multiple test signals to multiple flash memory controllers of the multiple SSD storage devices which are connected to the first external connection port interface and the at least one second external connection port interface via the first external connection port interface and the at least one second external connection port interface for performing corresponding testing. The multiple flash memory controllers are arranged for performing the corresponding testing upon multiple flash memory chips of the multiple SSD storage devices according to the multiple test signals received from the computer apparatus so as to respectively obtain and record multiple test results of the multiple SSD storage devices and then arranged for respectively reporting the multiple test results from the multiple flash memory controllers to the computer apparatus via the first external connection port interface and the at least one second external connection port interface to make the computer apparatus store the multiple test results into a storage circuit of the computer apparatus. The user interface comprises four operation regions. The first operation region is to be controlled by a user to select multiple test software tools via the first operation region to perform multiple testing tasks. The second operation region is to be controlled by the user to adjust an execution order of the multiple testing tasks of the multiple test software tools selected by the user via the second operation region. The third operation region is to be controlled by the user to configure multiple sets of setting parameters of the multiple test software tools via the third operation region. The fourth operation region is to be controlled by the user to select SSD devices as the multiple SSD storage devices to be tested by the multiple testing tasks via the fourth operation region.

It should be noted that the automatic test in one embodiment is implemented by coupling at least one first external connection port interface and at least one second external connection port interface to a computer apparatus. The first external connection port interface is different from the second external connection port interface. The automatic test is arranged to sequentially or simultaneously send multiple test signals to multiple flash memory controllers of multiple SSD storage devices, which are connected to the first external connection port interface and the at least one second external connection port interface, from the computer apparatus via the first external connection port interface and the at least one second external connection port interface respectively, for the test. The flash memory controllers are arranged for performing the corresponding testing upon multiple flash memory chips of the multiple SSD storage devices according to the multiple test signals received from the computer apparatus so as to respectively obtain and record multiple test results of the multiple SSD storage devices and then arranged for respectively reporting the multiple test results from the multiple flash memory controllers to the computer apparatus via the first external connection port interface and the at least one second external connection port interface to make the computer apparatus store/save the multiple test results into a storage circuit of the computer apparatus.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing an automatic test program and method/procedure having artificial intelligence. The automatic test procedure is arranged to use a specific program code or a software program package to integrate/consolidate usual or all standardized test software tools on the market. By using the automatic test procedure, a user or an operator at the factory only needs to use a user interface of a computer apparatus to manually set one or more test software tools which are required to be executed, decide which storage devices are to be tested (i.e. selecting some storage devices as devices to be tested), select single port sequential test or multiple port simultaneous test, and/or manually configure one or more sets of setting parameters for other/usual operations. After the manual setting of the user or operator, the automatic test procedure is capable of automatically activating and executing different test software tools, automatically performing tests upon the selected storage devices to be tested, automatically selecting whether to use the sequential test or simultaneous test upon different devices, automatically configuring and entering test parameters of different test software tools, and automatically completing different testing tasks of different test software tools, and so on.

In addition, the automatic test procedure in the invention can be also arranged to control the same test software tool to repeatedly perform automatic test upon one or more storage devices. Thus, for a user or an operator, it becomes more convenient. In addition, for mass production at the factory side, this can significantly improve the efficiency of a mass production testing procedure, save more waiting time, and improve correctness of test for the production line.

Figure 1:
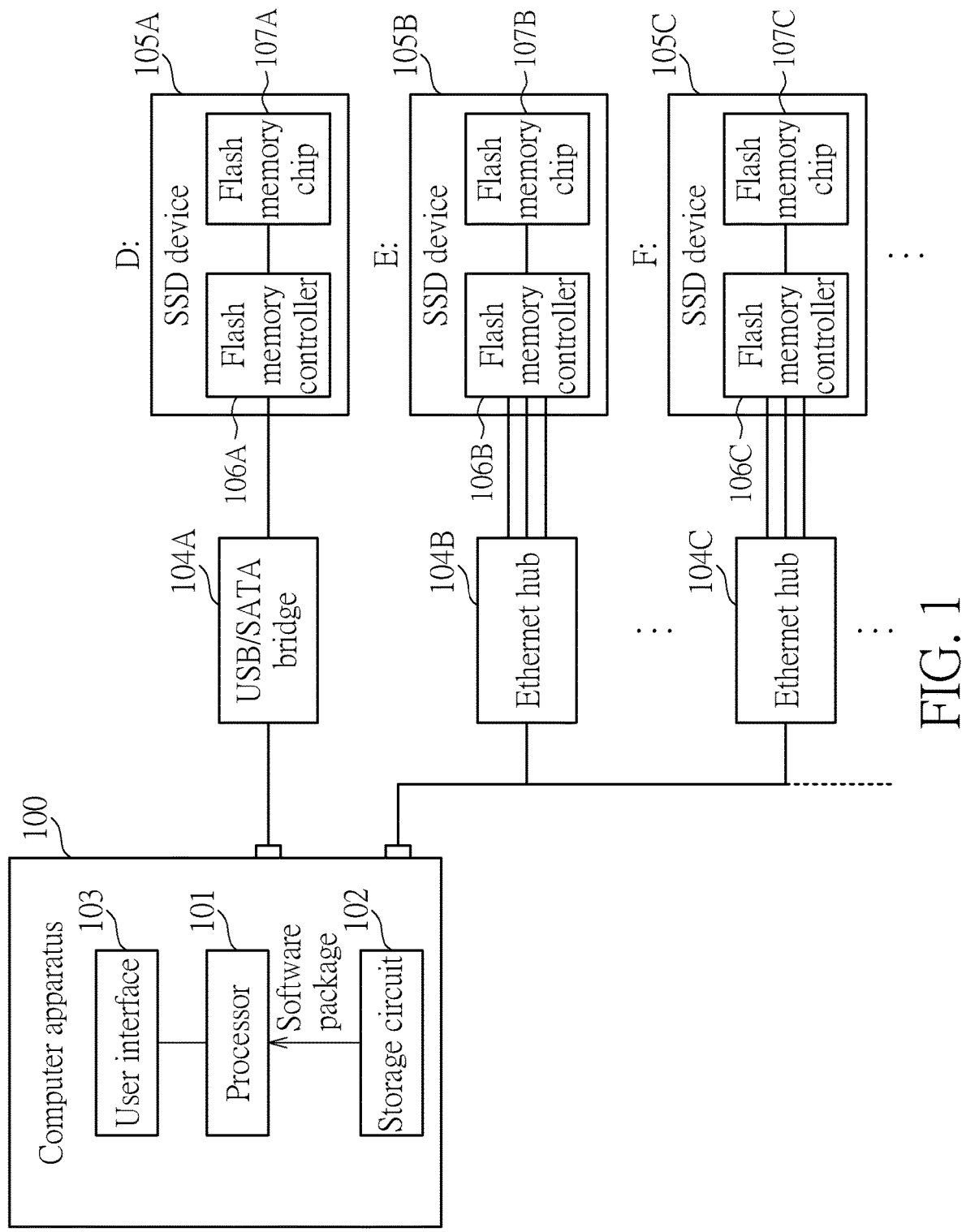
FIG. 1 is a device diagram of an automatic test method according to one embodiment of the invention.

Please refer to FIG. 1, which is a device diagram of an automatic test method according to one embodiment of the invention. As shown in FIG. 1, the automatic test method in the embodiments of the invention is arranged to be executed by the computer apparatus 100. The computer apparatus 100 for example is a computer apparatus carrying a windows operating system software program, e.g. the windows operating system Windows 7 or Windows 10 of Microsoft, Mac OS of Apple, or a windows system compatible with an operating system. The type and version of the window operating system are not meant to be limitations. In addition, the computer apparatus 100 comprises a processor 101 such as a central processing unit (CPU), a storage circuit 102 such as a memory, and a user interface 103.

The method flowchart of the automatic test procedure in the embodiments of the invention can be implemented by using a specific program code having artificial intelligence and is packed as a software program package. The software program package can be downloaded from Internet and stored in the storage circuit 102, so that the processor 110 can read and execute the specific program code comprised within the software program package. Alternatively, in other embodiments the software program package can be stored in a portable storage device. The processor 110 can read and execute the specific program code within the software program package by connecting the portable storage device into the computer apparatus 100.

Further, the software program further comprises multiple test software tool programs wherein the multiple test software tool programs may comprise a portion of portable programs and a portion of programs needed to be installed; a portable program means a program can be directly executed without installation. The multiple test software tool programs for example may comprise a software tool program used for SSD performance testing such as AS SSD Benchmark, a software tool program used for hard drive detection such as CrystalDiskInfo, a software tool program used for hard drive detection and repair such as HDTunePro, a software tool program used for burn-in testing such as BurnInTest, a software tool program used for read/write speed testing such as H2TestW, a software tool program used for hard drive partition creation such as CreatePartition, and/or a software tool program used for hard drive partition deletion such as DeletePartition. The test software tools can be multiple different software programs; this is not intended to be a limitation. For example, executing some test software tool may not need partition information. The automatic test procedure in the embodiments can perform the test software tool for hard drive partition deletion at first to delete originally specified partition information and then automatically perform the software tool program used for hard drive partition creation to recover the partition information after such test software tool which does not need partition information is executed completely. In addition, for a particular test software tool which needs partition information when executed, the automatic test procedure in the embodiments can perform the test software tool for hard drive partition creation to generate respective partition information of multiple storage devices at first so that such particular test software tool which needs partition information when executed can be successfully and automatically performed.

Further, the computer apparatus 100 may connected to multiple storage devices which are externally coupled and to be tested via one or more connection ports. For example, the multiple storage devices are SSD storage devices 105A-105C shown in FIG. 1 or other flash memory devices; this is not meant to be a limitation. Further, an SSD storage device may comprise a flash memory controller and at least one flash memory chip such as NAND-type flash memory chip or NOR-type flash memory chip. For example, the SSD storage device may comprise the flash memory controllers 106A-106C and flash memory chips 107A-107C, and so on. The flash memory controller is arranged to perform error correcting code (ECC) operation, wear leveling, bad block mapping, cache control, garbage collection, encryption, and reading/writing or erasing storage page(s)/block(s) of the flash memory chip, and so on.

In addition, when the processor 101 of the computer apparatus 100 performs a test software tool to test one or more SSD storage devices, the processor 101 is arranged to respectively send one or more corresponding test signals to flash memory controller(s) of one or more SSD storage devices via one or more external connection port interfaces of the computer apparatus 100. For example, if the processor 101 performs a read/write test software (but not limited), then one or more flash memory controllers will receive corresponding test signals for reading/writing. Then, the one or more flash memory controllers are arranged to read data from or write data into corresponding flash memory chip(s) for multiple times and record multiple test results for reading/writing. Then, the flash memory controllers are arranged to report the test results to the processor 101 of the computer apparatus 100 via the above-mentioned external connection port interfaces. As shown in FIG. 1, the first connection port for example is USB interface and is connected to the first storage device 105A to be tested via the USB/SATA bridge 104, and the partition of storage device 105A for example is partition D. Further, the second connection port for example is USB interface and is connected to multiple storage devices to be tested via multiple USB Ethernet hubs 104B and 104C. For example, the partition of the second storage device 105B to be tested is partition E, the partition of the third storage device 105C to be tested is partition F, and so on.

By operating a user interface of the computer apparatus 100, a user or operator can select or configure one or more test software tools to sequentially and/or simultaneously perform the automatic test upon the selected storage devices to automatically generate test results and store/display the test results. Compared to the conventional scheme which performs the testing manually, the method/flowchart in the embodiments can save more time and raise the efficiency of mass production at the factory side for the user/operator.

Figure 2:
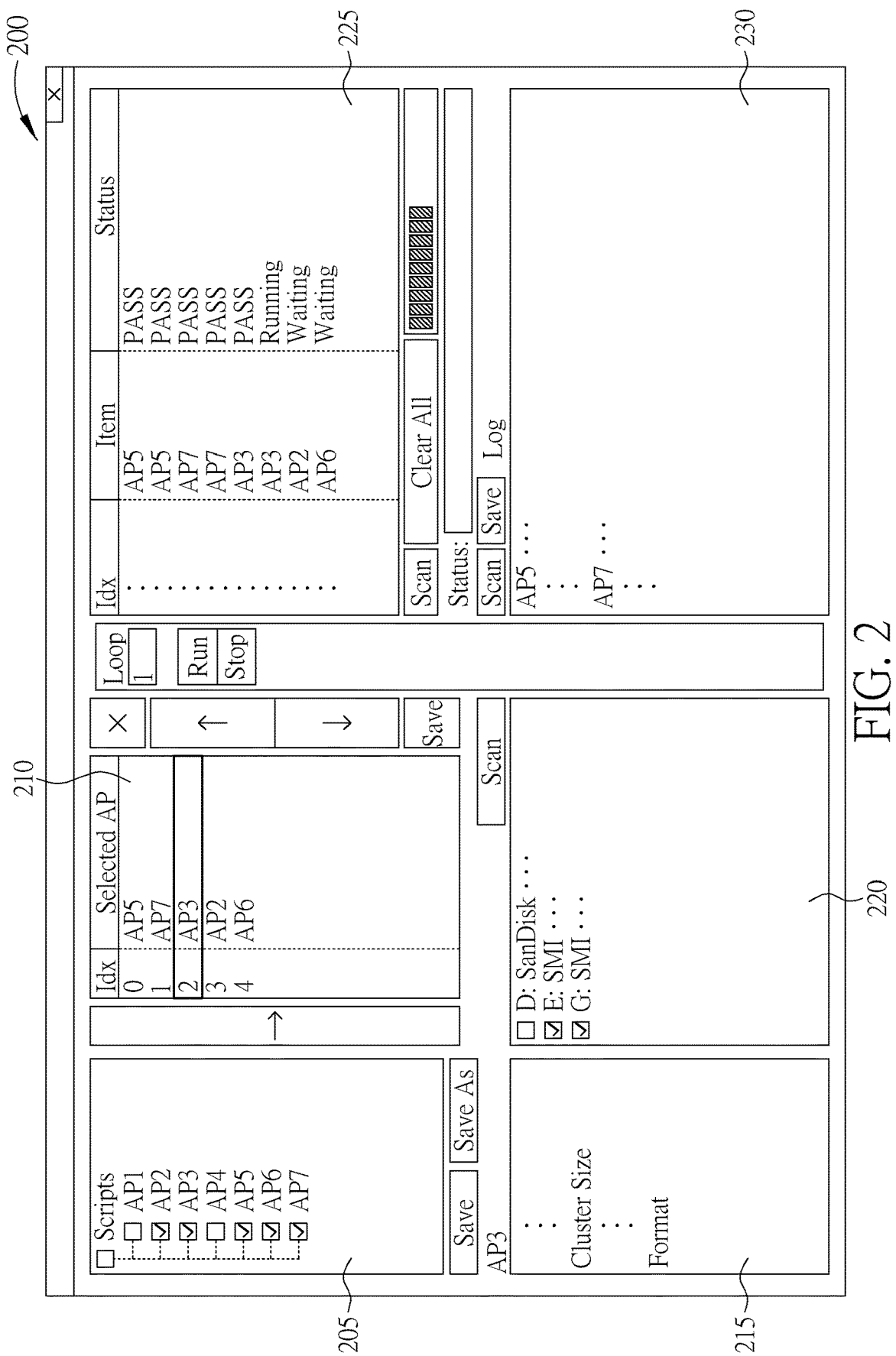
FIG. 2 is a diagram of an example showing a picture comprising the items, which can be operated and configured by the user, on the user interface of the computer apparatus when applying the method/flowchart into the computer apparatus.

Please refer to FIG. 2. FIG. 2 is a diagram of an example showing a picture comprising the items, which can be operated and configured by the user, on the user interface 103 of the computer apparatus 100 when applying the method/flowchart into the computer apparatus 100. As shown in FIG. 2, the picture 200 of user interface 103 of the computer apparatus 100 may be divided into multiple operation regions. For example, a first operation region is a test script setting region 205 which may comprise one or more test scripts having settings of different test software tools. FIG. 2 merely displays a setting of a test script; however, this is not intended to be a limitation. The user can check off a box (□) wherein the box is located before a corresponding test script to indicate that such test script is selected to perform the testing. In addition, the test script may include multiple different test items and software tools mentioned above. The user can check a software tool item(s) to be tested to indicate that one or more test items are selected to perform the testing. In addition, an arrow button "→" is on the right of the test script setting region 205. When the user presses the arrow button "→", the selected test script and/or the test item is/are selected into the second operation region 210 of the interface 200 of the computer apparatus 100. It should be noted that, to simplify the picture of the interface 200, multiple test items or software tools are shown by AP1-AP7. However, a number of test software tools is not intended to be a limitation.

The second operation region 210 is an order adjusting region for adjusting the order of the selected test items. In the order adjusting region 210, the numbers of index "Idx" respectively mean execution orders for different test items.

For example, the number zero means that the first test item to be executed is the software program APS, e.g. a software program of hard disk drive partition creation CreatePartition. The number four means that the last test item to be executed is the software program AP6, e.g. a software tool program used for read/write speed testing such as H2TestW. In addition, "Selected AP" means the selected items of test software tools of the same or different test scripts. In addition, the user can select a test item (i.e. a particular software program) by highlighting the text of the particular software program using the left mouse button. For example, the user can select the test item of AP3 and then press the button "x" to delete the selected test item of AP3 from the list of "Selected AP". The user can press the arrow button "↑" to move up the selected test item one space. The user can press the arrow button "↓" to move down the selected test item one space. The user can press the button "Save" to save the execution orders of the multiple test items. If a title of a test item is too long, then the user may use a scroll bar below the order adjusting region 210 to move the scroll bar to the right or to the left to display the title of such test item.

Further, the user interface of the computer apparatus 100 comprises the third operation region is a test software tool setting region 215. When the user selects a certain test item in the order adjusting region 210 by highlighting the text of such certain test item using the left mouse button, in this embodiment, the test software tool setting region 215 is arranged to correspondingly display the name of the title of the selected test item, multiple sets of adjustable setting parameters, and content. For example, in FIG. 2, the test software tool setting region 215 displays the name of title of software program AP3 which is for example the test software tool for hard drive partition creation CreatePartition. The test software tool setting region 215 also displays and lists a set of multiple setting parameters which are adjustable for the user, e.g. the size of cluster "Cluster Size", Enable Format, and Quick Format, and so on. The setting parameters displayed by the test software tool setting region 215 for example may be stored in a text file. The user may directly modify and store the parameters in the text file via the test software tool setting region 215. For example, the user may use the file name of originally used test script to store a set of setting parameters by pressing the button "Save" above the test software tool setting region 215. Alternatively, the user may store a set of setting parameters as a text file which has a file name is preferred by the user by pressing the button "Save As". In addition, in other embodiments, the user modified format shown in the test software tool setting region 215 can be implemented by using options and/or scroll bars. This can make the user easily complete the setting of a set of setting parameters of a test software tool by simply clicking/checking the options and moving the bars. In addition, the set of setting parameters can be all configurable setting parameters of a certain test software tool or import/frequency used setting parameters of a certain test software tool. In addition, the software program package in the invention may also comprise all setting parameters of one test software tool. The test software tool setting region 215 can be arranged to display or provide the import/frequency used setting parameters for the user so that the user can configure the settings by him or her.

Further, the fourth operation region comprised by the user interface of the computer apparatus 100 is a partition setting region 220. The partition setting region 220 is used to display all storage devices and corresponding partitions which are connected or externally coupled to the computer apparatus 100. For example, in FIG. 2, the partition setting region 220 displays that there are three storage devices to be tested currently which respectively correspond to the partition D, partition E, and the partition G, and also can display the names and manufacturer information of the three storage devices. In addition, the user can check the boxes of the names of the three storage devices to be tested to indicate that the three storage devices will be tested. For example, in FIG. 2, the user checks the boxes of the partition E and partition G of two storage devices to be tested. Accordingly, the automatic test method and procedure then perform the automatic test merely upon the partition E and partition G of the two storage devices to be tested without testing the storage device at the partition D. However, this is not intended to be a limitation of the invention. In addition, the user may press the button 'Scan' at the upper right corner of the partition setting region 220 to scan all storage devices to update information of all the connected storage devices to be tested.

Further, in one embodiment, the software program package provided by the method of the invention can be arranged to automatically scan names and product serials of all externally connected SSD devices and can filter out the system drive, i.e. the partition C, when the software program package is executed.

Further, in one embodiment, the provided method and flow are capable of repeatedly performing the automatic test programs and steps. For example, as shown in FIG. 2, the field 'Loop' is displayed. If the value of the field 'Loop' is equal to N (i.e. an integer), then this indicates that the provided method and flow are arranged to repeatedly perform the configured automatic test program(s) or step(s). That is, the configured automatic test program(s) or step(s) totally are executed for N+1 times. For instance, if the value of the field 'Loop' is equal to 1, then the configured automatic test program(s) or step (s) totally are executed for two times. If the value of the field 'Loop' is equal to zero, then the configured automatic test program(s) or step(s) totally are executed for only one time. The user can fill an integer in the field 'Loop' by himself/herself.

The interface 200 further includes an activation button "Run" and a stop/pause button "Stop". When the user presses the activation button "Run", the provided method and flow are arranged to immediately start to execute the configured automatic test program(s) or step(s) mentioned above. When the user presses the stop/pause button "Stop", the provided method and flow are arranged to immediately stop or pause executing the operation(s) of the test software tool(s).

Further, the operation interface of the computer apparatus 100 further includes the fifth operation region. The fifth operation region is a test item status and progress region 225. After the user presses the activation button "Run", the test item status and progress region 225 is used to display the name (s) "Item", testing status "Status", and testing orders/priorities "Idx" of item(s) of test software tool(s) has/have been tested, the item(s) of test software tool(s) currently tested, the item(s) of test software tool(s) that wait(s) for execution(s). For example, as shown in FIG. 2, the test software tools AP5 and AP7 have been respectively tested for two times, and the statuses for testing the selected one or more storage devices are "PASS". The test software tool AP3 executed for the first time has been executed, and the statuses for testing the selected one or more storage devices are "PASS". The status of the test software tool AP3 executed for the second time is "Running". In addition, the statuses of test software tools AP2 and AP6 are "Waiting". In addition, the test item status and progress region 225 further includes a deletion button "x", all-clear button "Clear All", and a progress bar. The user may select the status of one test item and then press the deletion button to delete the result and detail content of such test item. In addition, if the user presses the all-clear button, then the flow and method is arranged to delete all results and detail contents of all test items.

Further, the operation interface of computer apparatus 100 further includes a sixth operation region. The sixth operation region is a test item detail result region 230. The detail results of one or more configured test items, i.e. software programs, mentioned above for testing one or more storage devices is/are sequentially listed and displayed in the test item detail result region 230. In addition, the test item detail result region 230 includes a deletion button "x", a save button "Save", and a log button "Log". When the user presses the deletion button, the provided method flow is arranged to delete the content displayed in the test item detail result region 230. When the user presses the save button, the provided method flow is arranged to store or save the content displayed in the test item detail result region 230. In addition, when the user presses the log button, the provided method flow is arranged to display content of a log file associated with the saved content displayed in the test item detail result region 230 for the user.

In practice, the software program package in the provided method flow is designed to integrate and comprise different usual test software tools on the market which are implemented within the same software program package. The multiple test software tools of the software program package can be stored in a specific directory. The test software tools may comprise a portion of xcopy installation (i.e. portable or free installation) test software tools and a portion of test software tools which are needed to be installed before being executed. For example, the software program BurnInTest is needed to be installed before being executed, and the other software programs mentioned above can be xcopy installation test software tools. For example, the processor 101 may execute the specific program code to activate the provided method flow to automatically install the test software tool which is needed to be installed at first and then to record the execution path of the test software tool after installation. In addition, for the portable test software tools, the processor 101 may execute the specific program code to record execution paths of respective test software tools.

The processor 101 is arranged to execute the specific program code to open or activate a test software tool. In windows operating system executed by the computer apparatus 100, executing the specific program code is arranged to activate a corresponding child window. The child window has a corresponding window title, and the test software tool after activation has a corresponding handle which is used to control the corresponding child window. The access authority may be represented by codes, addresses or identification values. In one embodiment of the method, the processor 101 is arranged to execute the specific program code to call a standardization Windows API function such as FindWindow function to identify and find a corresponding child window title and find a corresponding handle, to control/operate the child window of the test software tool, identify a handle of a specific button of the child window from the handle of the child window, and to configure the state of the button according to the handle of the button, to thereby implement a simulated manual click or selection. By doing so, the provided method flow can automatically enter a setting page of the test software tool and then to configure one or more test parameters of the test software tool.

For example, executing the specific program code may use the FindWindow function to find a corresponding child window title to identify a corresponding handle, then to identify a handle of a particular button (e.g. button 'Y' or button 'Next') of the child window based on the handle of the child window, and then to configure the state of the button according to the handle of the button, so as to simulate manual click or selection of different buttons. For instance, a test software tool may sequentially generate multiple child windows. The test software tool for example generate a first child window and a button 'Next' and then generates a second child window and a button 'Y', and finally the flow enters the setting page (but not limited). When the processor 101 executes the specific program code to activate the test software tool, the provided method can call the FindWindow function to identify and find the title of the first child window and the handle, then to identify the handle of the button 'Next' according to the handle of the first child window, then to configure the state of the button 'Next' according to the handle of the button 'Next', to automatically simulate a manual click on the button. Then, the picture of the screen displays that the flow generates and enters the second child window. The provided method flow can call the FindWindow function again to identify and find the title and handle of the second child window, then to identify the handle of the button 'Y' according to the handle of the second child window, then to configure the state of the button 'Y' according to the handle of the button 'Y', to automatically simulate a manual click on the button. Thus, the provided method flow finally can automatically enter the setting page of the test software tool to configure the setting parameter (s). For configuring the setting parameter(s), similarly, by using the processor 101 to execute the specific program code, the provided method flow can identify and find a title of the setting page and a corresponding handle, to thereby configure states and values of different fields of the setting page according to such corresponding handle to complete the automatic configuration procedure of the test software tool. After the configuration is completed, the method flow for example returns back to the main screen window of the test software tool. In this situation, the specific program code can also call the FindWindow function to identify and find the title of the main screen window and a corresponding handle, to obtain the handle of a start button of the main screen window accordingly. Then, the method flow configures the state of the start button according to the handle of the start button to automatically simulate a manual click on the start button so as to automatically activate or start a testing task of the test software tool.

The program of the method flow may generate a thread to watch and monitor the test software tool that is currently executed. The thread is arranged for continuously and periodically polling the test software tool to make the test software tool report the currently executed progress and detail content, and the thread for example may generate a text window to display the progress. If the automatic test for the test software tool is completed, then the text window is arranged to display a message of success. Instead, if an error occurs, then the text window is arranged to display a message of an error. The processor 101 executes the specific program code to fetch and view/check whether the above-mentioned keyword is generated. When the processor 101 fetches the message of the success, it represents that the automatic test for the test software tool has been completed and the result is pass, and the specific program code is arranged to enter the log file generated by executing the test software tool to fetch the log file and to save the information of the log file as a format which can be viewed by the user. The specific program code disables or closes the execution of the test software tool and then activates or opens another test software tool which is ready for the execution of automatic test at the next. Identically, the operations that are executed after the specific program code activates the another test software tool which is ready for the execution of automatic test at the next is also similar to the operations mentioned above. The detail description is not described for brevity.

Further, the above-mentioned specific program code is arranged to call the FindWindow function to obtain the handle. In other embodiments, the specific program code may employ different software program(s)/tool(s) to identify and find ID(s) of corresponding program object (s) and then to configure or control state (s), value (s), behavior(s) and operation(s) of the corresponding program object(s) according to the ID(s). For example, after activating a test software tool such as H2TestW, the specific program code is arranged to employ and execute a software tool Spy carried by the Microsoft Window's operating system (but not limited) to identify and find ID of each program object, e.g. fetching ID(s) of program object(s) of any button(s) mentioned above and/or ID(s) of program object(s) of the setting page(s) mentioned above, and then to control the program object(s) of the button(s) or the program object(s) of the setting page(s) based on the ID(s), to thereby control the state(s) of the button(s) and field setting(s) of the setting page(s) to simulate click(s)/selection(s) on the button(s) and configure value(s) and data of the setting field(s).

Further, the automatic test procedure code in the embodiments of the invention is capable of performing testing upon the multiple SSD storage devices sequentially using a single port or simultaneously using multiple ports. Using a single port sequentially means only one storage device is tested for one time. Using multiple ports simultaneously means multiple storage devices can be tested simultaneously for one time. For example, for the test software tool BurnInTest, the tool BurnInTest itself may support the function of multiple ports testing. Accordingly, for example, the specific program code in the embodiments of the invention may fetch a corresponding handle to enter a setting page to configure the function of the multiple ports testing and to select multiple partitions for the test.

For the test software tool H2TestW, the test software tool H2TestW itself may not support the function of multiple ports testing. However, in one embodiment, the specific program code can simultaneously open and execute multiple instances of test software tool H2TestW wherein each instance is arranged to execute the FindWindow function to identify and find IDs of different objects to obtain the handles of the different objects. When configuring the fields and parameters of multiple setting pages of the multiple instances, the program code may be arranged to sequentially configure fields and parameters. For example, the program code may complete the configuration of a setting page of a program instance at first and then open and configure a setting page of another different program instance. For the different program instances, the IDs of objects may be identical; however, the handles of the objects which are found by calling and executing the FindWindow function are different. That is, the handles of the objects of the setting pages of a test software tool for testing different storage devices are different. For example, two different program instances executed sequentially may employ the same object ID to find two different handles. For example, the two different program instances executed sequentially both may have a function of a button. Later, when the first program instance needs to simulate a click on its button, the first program instance is arranged configure the state of its button by controlling a corresponding handle to implement the automatic click on its button. When the second program instance needs to simulate a click on its button, the second program instance is arranged configure the state of its button by controlling a different corresponding handle to implement the automatic click on its button. Accordingly, no errors will occur when the different program instances use the same object ID to obtain different handles.

Figure 3:
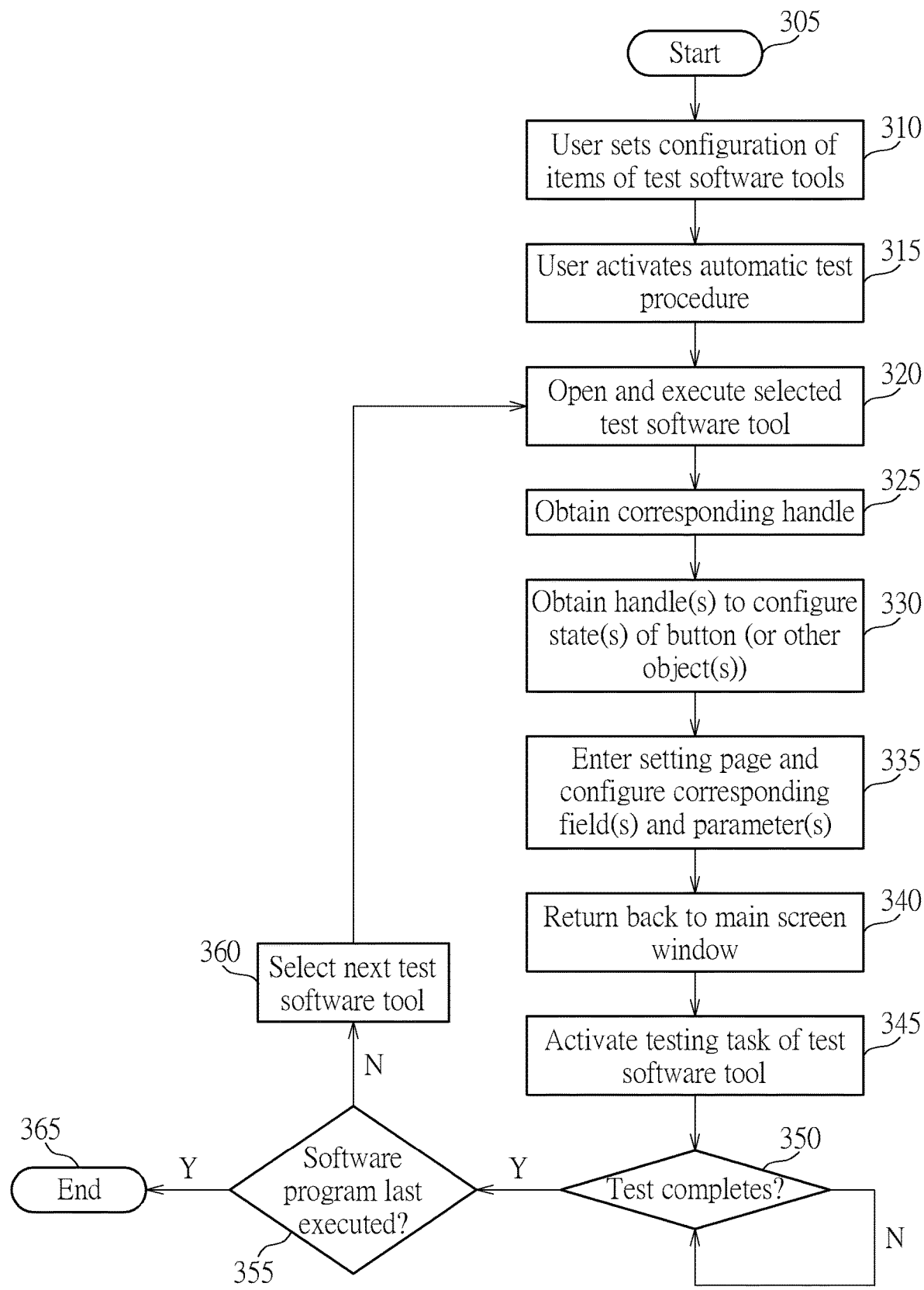
FIG. 3 is a diagram of an example of the automatic test flow for activating and executing a test software tool or a program instance of a test software tool according to one embodiment of the invention.

To make readers more clearly understand the spirits of the invention, FIG. 3 is provided. FIG. 3 is a diagram of an example of the automatic test flow for activating and executing a test software tool or a program instance of a test software tool according to one embodiment of the invention. Provided that substantially the same result is achieved, the steps of the flowchart shown in FIG. 3 need not be in the exact order shown and need not be contiguous, that is, other steps can be intermediate. Steps are detailed in the following:

Step 305: Start;

Step 310: A user sets the configuration of the items of the test software tools via the user interface 200 of the computer apparatus 100;

Step 315: The user activates the automatic test procedure;

Step 320: The automatic test procedure opens and executes a selected test software tool according to the program path of the directory;

Step 325: The automatic test procedure finds the title of a corresponding child window, which is used for setting the test software tool, to obtain a corresponding handle by calling the FindWindow function or fetches ID of a corresponding program object to obtain the corresponding handle;

Step 330: The automatic test procedure obtains handle(s) of a button (or other object(s)) according to the corresponding handle to configure the state(s) of the button (or other object(s)) based on the obtained handle(s);

Step 335: Enter the setting page of the test software tool and configure corresponding field(s) and parameter(s) according to the setting parameter(s) selected by the user;

Step 340: Return back to the main screen window of executing the test software;

Step 345: Fetch the name or corresponding object ID of the start button of the main screen window to obtain a corresponding handle and then set the state of the start button as activated according to the corresponding handle to activate a testing task of the test software tool;

Step 350: Poll the test software tool to check whether the automatic test is completed; if the test is completed, the flow proceeds to Step 355; otherwise, the flow proceeds to Step 350;

Step 355: Check whether the selected test software tool is a software program last executed? If the selected test software tool is a software program last executed, the flow proceeds to Step 365, otherwise, the flow proceeds to Step 360;

Step 360: Select a next test software tool; and

Step 365: End.

It should be noted that the test software tool is arranged to perform a testing task for all storage devices to be tested one by one after the testing task of the test software tool is activated and executed if it is configured to be executed sequentially using single port. The test software tool is arranged to perform a testing task for all storage devices to be tested simultaneously after the testing task of the test software tool is activated and executed if it is configured to be executed simultaneously using multiple ports. In this situation, if the test software tool itself does not support the function of using multiple ports for test, the automatic test procedure in the embodiments of the invention is arranged to open multiple program instances for the test software tool to simultaneously perform the testing task for multiple storage devices to be tested.

Further, in practice, the method flow of the invention may be arranged to fetch a product serial of each externally connected storage device. Thus, when performing the automatic test of a test software tool, the method flow can obtain information of which storage device is being tested, which storage device(s) has/have been tested and passed the test, and which storage device(s) is/are not tested, according to the different and unique product serials. Accordingly, even without the partition information, the method flow of the invention based on the different and unique product serials can also correctly determine which storage device(s) has/have been tested and passed the test. Further, by using a photograph capture software program such as Snapshot, the method flow of the invention can be arranged to take a screenshot of the execution results of different test software tools and save the screenshot each time after the execution of a test script is completed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing an automatic test upon multiple solid-state drive (SSD) storage devices to be tested, the multiple SSD storage devices to be connected to a computer apparatus via a first external connection port interface and at least one second external connection port interface, the first external connection port interface being different from the at least one second external connection port interface, the computer apparatus including a user interface, the automatic test controlled by the computer apparatus to sequentially or simultaneously send multiple test signals to multiple flash memory controllers of the multiple SSD storage devices which are connected to the first external connection port interface and the at least one second external connection port interface via the first external connection port interface and the at least one second external connection port interface for performing corresponding testing, the multiple flash memory controllers being arranged for performing the corresponding testing upon multiple flash memory chips of the multiple SSD storage devices according to the multiple test signals received from the computer apparatus so as to respectively obtain and record multiple test results of the multiple SSD storage devices and then arranged for respectively reporting the multiple test results from the multiple flash memory controllers to the computer apparatus via the first external connection port interface and the at least one second external connection port interface to make the computer apparatus store the multiple test results into a storage circuit of the computer apparatus, and the method comprises:

providing the user interface which is to be controlled by a user to input at least one set of setting parameters used by execution of a testing task of at least one test software tool upon the multiple SSD storage devices;

automatically configuring information of at least one field referenced by the execution of the testing task of the at least one test software tool according to the at least one set of setting parameters;

automatically executing the at least one test software tool to perform the testing task respectively upon the multiple SSD storage devices according to the information of the at least one field; and automatically storing a test result of the testing task completed by the at least one test software tool and displaying the test result on the user interface to notify the user.

2. The method of claim 1, wherein the at least one test software tool comprises a plurality of test software tools, and the user interface is to be used by the user to:

input a plurality of sets of setting parameters to automatically configure information of a plurality of fields referenced by multiple testing tasks executed by the plurality of test software tools according to the plurality of sets of setting parameters;

automatically execute the plurality of test software tools to perform the multiple testing tasks respectively upon the multiple SSD storage devices according to the information of the plurality of fields; and automatically store a plurality of test results of the multiple testing tasks completed by the plurality of test software tools and then displaying the plurality of test results on the user interface to notify the user.

3. The method of claim 1, wherein the step of automatically configuring information of at least one field referenced by the execution of the testing task of the at least one test software tool according to the at least one set of setting parameters comprises:

executing a specific program code to activate the at least one test software tool;

identifying and obtaining a title of a child window corresponding to the at least one test software tool to obtain a handle of the child window;

identifying and obtaining a name or an identification (ID) of at least one object according to the handle of the child window, to obtain a handle of the at least one object;

activating and entering a setting page of the at least one test software tool according to the handle of the at least one object; and configuring the information of the at least one field in the setting page according to the at least one set of setting parameters.

4. The method of claim 1, wherein the step of automatically executing the at least one test software tool to perform the testing task respectively upon the multiple SSD storage devices according to the information of the at least one field comprises:

executing a specific program code to identify and obtain a handle of at least one object required by an activation of the testing task of the at least one test software tool; and activating the testing task of the at least one test software tool according to the handle of the at least one object.

5. The method of claim 4, wherein the testing task is arranged to perform testing upon the multiple SSD storage devices sequentially using a single port or simultaneously using multiple ports.

6. The method of claim 5, wherein the testing task is arranged to perform testing upon the multiple SSD storage devices according to multiple partitions respectively corresponding to the multiple SSD storage devices or multiple serial numbers respectively corresponding to the multiple SSD storage devices.

7. The method of claim 1, further comprising:
automatically scanning names and product serial numbers of all externally connected SSD storage devices and filtering out a system drive partition to obtain the multiple SSD storage devices.

8. The method of claim 1, wherein the automatically executing step and the automatically storing step are performed repeatedly, and the at least one test software tool comprises at least one of the following tools comprising: a software tool program AS SSD Benchmark for SSD performance testing, a software tool program CrystalDiskInfo for hard drive detection, a software tool program HDTunePro for hard drive detection and repair, a software tool program BurnInTest for burn-in testing, a software tool program H2TestW for read/write speed testing, a software tool program CreatePartition for hard drive partition creation, and a software tool program DeletePartition for hard drive partition deletion.

9. A computer apparatus used for performing an automatic test upon multiple SSD storage devices to be tested, the multiple SSD storage devices to be connected to a computer apparatus via a first external connection port interface and at least one second external connection port interface, the first external connection port interface being different from the at least one second external connection port interface, the computer apparatus including a user interface, the automatic test controlled by the computer apparatus to sequentially or simultaneously send multiple test signals to multiple flash memory controllers of the multiple SSD storage devices which are connected to the first external connection port interface and the at least one second external connection port interface via the first external connection port interface and the at least one second external connection port interface for performing corresponding testing, the multiple flash memory controllers being arranged for performing the corresponding testing upon multiple flash memory chips of the multiple SSD storage devices according to the multiple test signals received from the computer apparatus so as to respectively obtain and record multiple test results of the multiple SSD storage devices and then arranged for respectively reporting the multiple test results from the multiple flash memory controllers to the computer apparatus via the first external connection port interface and the at least one second external connection port interface to make the computer apparatus store the multiple test results into a storage circuit of the computer apparatus, and the computer apparatus comprises:
the user interface which is to be controlled by a user to input at least one set of setting parameters used by execution of a testing task of at least one test software tool upon the multiple SSD storage devices;
the storage circuit, used for storing a specific program code for performing the automatic test;
a processor, coupled to the storage circuit and the user interface, used for reading the specific program code form the storage circuit to execute the specific program code for:
automatically configuring information of at least one field referenced by the execution of the testing task of the at least one test software tool according to the at least one set of setting parameters;
automatically executing the at least one test software tool to perform the testing task respectively upon the multiple SSD storage devices according to the information of the at least one field; and
automatically storing a test result of the testing task completed by the at least one test software tool and displaying the test result on the user interface to notify the user.

10. The computer apparatus of claim 9, wherein the at least one test software tool comprises a plurality of test software tools, the user interface is to be used by the user to input a plurality of sets of setting parameters, and the processor is arranged to execute the specific program code to:
automatically configure information of a plurality of fields referenced by multiple testing tasks executed by the plurality of test software tools according to the plurality of sets of setting parameters;
automatically execute the plurality of test software tools to perform the multiple testing tasks respectively upon the multiple SSD storage devices according to the information of the plurality of fields; and
automatically store a plurality of test results of the multiple testing tasks completed by the plurality of test software tools and then displaying the plurality of test results on the user interface to notify the user.

11. The computer apparatus of claim 9, wherein the processor is arranged for executing the specific program code to:
activate the at least one test software tool;
identify and obtain a title of a child window corresponding to the at least one test software tool to obtain a handle of the child window;
identify and obtain a name or an identification (ID) of at least one object according to the handle of the child window, to obtain a handle of the at least one object;
activate and enter a setting page of the at least one test software tool according to the handle of the at least one object; and
configure the information of the at least one field in the setting page according to the at least one set of setting parameters.

12. The computer apparatus of claim 9, wherein the processor is arranged for executing the specific program code to:
identify and obtain a handle of at least one object required by an activation of the testing task of the at least one test software tool; and
activate the testing task of the at least one test software tool according to the handle of the at least one object.

13. The computer apparatus of claim 12, wherein the testing task is arranged to perform testing upon the multiple SSD storage devices sequentially using a single port or simultaneously using multiple ports.

14. The computer apparatus of claim 13, wherein the testing task is arranged to perform testing upon the multiple SSD storage devices according to multiple partitions respectively corresponding to the multiple SSD storage devices or multiple serial numbers respectively corresponding to the multiple SSD storage devices.

15. The computer apparatus of claim 9, wherein the processor is arranged for automatically scanning names and product serial numbers of all externally connected SSD storage devices and filtering out a system drive partition to obtain the multiple SSD storage devices.

16. The computer apparatus of claim 9, wherein the steps executed by the processor are performed repeatedly, and the at least one test software tool comprises at least one of the following tools comprising: a software tool program AS SSD Benchmark for SSD performance testing, a software tool program CrystalDiskInfo for hard drive detection, a software tool program HDTunePro for hard drive detection and repair, a software tool program BurnInTest for burn-in testing, a software tool program H2TestW for read/write speed testing, a software tool program CreatePartition for hard drive partition creation, and a software tool program DeletePartition for hard drive partition deletion.

17. A user interface of a computer apparatus capable of performing an automatic test upon multiple SSD storage devices to be tested, the multiple SSD storage devices to be connected to a computer apparatus via a first external connection port interface and at least one second external connection port interface, the first external connection port interface being different from the at least one second external connection port interface, the automatic test controlled by the computer apparatus to sequentially or simultaneously send multiple test signals to multiple flash memory controllers of the multiple SSD storage devices which are connected to the first external connection port interface and the at least one second external connection port interface via the first external connection port interface and the at least one second external connection port interface for performing corresponding testing, the multiple flash memory controllers being arranged for performing the corresponding testing upon multiple flash memory chips of the multiple SSD storage devices according to the multiple test signals received from the computer apparatus so as to respectively obtain and record multiple test results of the multiple SSD storage devices and then arranged for respectively reporting the multiple test results from the multiple flash memory controllers to the computer apparatus via the first external connection port interface and the at least one second external connection port interface to make the computer apparatus store the multiple test results into a storage circuit of the computer apparatus, and the user interface comprises:

a first operation region which is to be controlled by a user to select multiple test software tools via the first operation region to perform multiple testing tasks;

a second operation region which is to be controlled by the user to adjust an execution order of the multiple testing tasks of the multiple test software tools selected by the user via the second operation region;

a third operation region which is to be controlled by the user to configure multiple sets of setting parameters of the multiple test software tools via the third operation region; and a fourth operation region which is to be controlled by the user to select SSD devices as the multiple SSD devices to be tested by the multiple testing tasks via the fourth operation region.

18. The user interface of claim 17, further comprising:

a fifth operation region, used for displaying test results of the multiple testing tasks being currently executed; and a sixth operation region, used for displaying a detailed test procedure of the displayed test results.

19. The user interface of claim 17, wherein names and product serial numbers of all externally connected SSD storage devices are scanned and a system drive partition is filtered out of the scanned SSD storage devices to obtain the multiple SSD storage devices.

20. The user interface of claim 17, wherein the at least one test software tool comprises at least one of the following tools comprising: a software tool program AS SSD Benchmark for SSD performance testing, a software tool program CrystalDiskInfo for hard drive detection, a software tool program HDTunePro for hard drive detection and repair, a software tool program BurnInTest for burn-in testing, a software tool program H2TestW for read/write speed testing, a software tool program Create Partition for hard drive partition creation, and a software tool program DeletePartition for hard drive partition deletion.

* * * * *